(12) United States Patent
Chen et al.

(10) Patent No.: US 9,473,010 B2
(45) Date of Patent: Oct. 18, 2016

(54) VOICE COIL MOTOR ARRAY MODULE

(71) Applicants: LITE-ON ELECTRONICS (GUANGZHOU) LIMITED, Guangzhou (CN); LITE-ON TECHNOLOGY CORP., Taipei (TW)

(72) Inventors: Ying-Chieh Chen, Taipei (TW); Tsung-Kai Chang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 53 days.

(21) Appl. No.: 14/578,601

(22) Filed: Dec. 22, 2014

(65) Prior Publication Data

US 2015/0316745 A1 Nov. 5, 2015

(30) Foreign Application Priority Data

Apr. 30, 2014 (CN) .................... 2014 2 0220488 U

(51) Int. Cl.
*G02B 7/02* (2006.01)
*H02K 41/03* (2006.01)
*H02K 41/035* (2006.01)
*G02B 7/09* (2006.01)
*G02B 7/08* (2006.01)
*G02B 27/64* (2006.01)
*G02B 3/00* (2006.01)

(52) U.S. Cl.
CPC .............. *H02K 41/0356* (2013.01); *G02B 7/08* (2013.01); *G02B 7/09* (2013.01); *H02K 41/035* (2013.01); *H02K 41/0354* (2013.01); *G02B 3/0006* (2013.01); *G02B 27/646* (2013.01)

(58) Field of Classification Search
CPC ........... H02K 41/035; H02K 41/0354; H02K 41/0356; H02K 5/04; G02B 7/023; G02B 7/04; G02B 7/09; G02B 27/64; G02B 27/646; H04N 5/2252; H04N 5/2254; G03B 3/10
USPC .............. 359/811, 813, 814, 824; 310/12.06, 310/12.16, 15, 36; 348/373, 374; 396/133, 396/529
See application file for complete search history.

(56) References Cited

U.S. PATENT DOCUMENTS

| | | | | |
|---|---|---|---|---|
| 6,339,266 | B1 * | 1/2002 | Tanaka ..................... | B23Q 5/28 310/12.06 |
| 6,661,129 | B2 * | 12/2003 | Tamura .............. | H02K 41/0356 310/12.16 |
| 8,639,106 | B1 * | 1/2014 | Gleason ................... | G03B 3/10 396/133 |

* cited by examiner

*Primary Examiner* — Loha Ben
(74) *Attorney, Agent, or Firm* — Rosenberg, Klein & Lee

(57) ABSTRACT

A voice coil motor array module includes a carrier, and a plurality of voice coil motors disposed on the carrier and arranged side by side in at least one row along an arrangement direction. Each voice coil motor includes a lens holder having a holder body and a coil wound around the holder body, and two magnetic components respectively disposed on two opposite sides of the holder body and having the same magnetic poles facing each other. When the coil is energized, the coil interacts with the magnetic components to drive displacement of the holder body along a direction parallel to a normal direction of a plane of the arrangement direction.

8 Claims, 5 Drawing Sheets

VOICE COIL MOTOR ARRAY MODULE

CROSS REFERENCE TO RELATED APPLICATION

This application claims priority of Chinese Patent Application Number 201420220488.4, filed on Apr. 30, 2014.

FIELD OF THE INVENTION

The invention relates to a motor, more particularly to a voice coil motor array module.

BACKGROUND OF THE INVENTION

Following the advancement and humanization of technology, current electronic devices, such as smart phones, tablet computers, etc., have a camera function. Generally, each of the electronic devices uses a voice coil motor (VCM) for driving automatic focus of the lens of the camera.

The voice coil motor includes a plurality of magnetic components, a coil, and a lens holder for carrying the lens. When the coil is energized, the coil interacts with the magnetic components to drive the lens holder and move the lens to focus shooting so as to capture an image.

Due to the increasing demand for higher image quality, at present, images obtained using a plurality of lenses may undergo image processing to obtain a fused image having a high image quality. How to arrange a plurality of voice coil motors together to drive a plurality of lenses to proceed with shooting and obtain a high quality and small parallax image becomes the current development trend of an image capture system. However, in order to arrange the plurality of the voice coil motors together, the first problem to be resolved is how to minimize magnetic attraction and repulsion between magnetic components of the voice coil motors during an assembly process when the magnetic components are arranged too close to each other. Hence, how to develop a voice coil motor array module with magnetic components that do not interfere with each other is an issue currently pursued by the industry.

SUMMARY OF THE INVENTION

Therefore, an object of the present invention is to provide a voice coil motor array module that is capable of overcoming the aforesaid drawbacks of the prior art.

Accordingly, a voice coil motor array module comprises a carrier, and a plurality of voice coil motors disposed on the carrier and arranged side by side in at least one row along an arrangement direction. Each of the voice coil motors includes a lens holder having a holder body and a coil wound around the holder body, and two magnetic components respectively disposed on two opposite sides of the holder body and having the same magnetic poles facing each other. When the coil is energized, the coil interacts with the magnetic components to drive displacement of the holder body along a direction parallel to a normal direction of a plane of the arrangement direction.

The efficiency of this invention resides in that by keeping the voice coil motors at suitable distances and in an adjacent arrangement with respect to one another, the voice coil motor array module of this invention can effectively avoid interference caused by magnetic attraction and repulsion between two adjacent voice coil motors, so that the voice coil motors can independently drive displacement of the lenses for focusing and capturing images with high resolution and small parallax.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
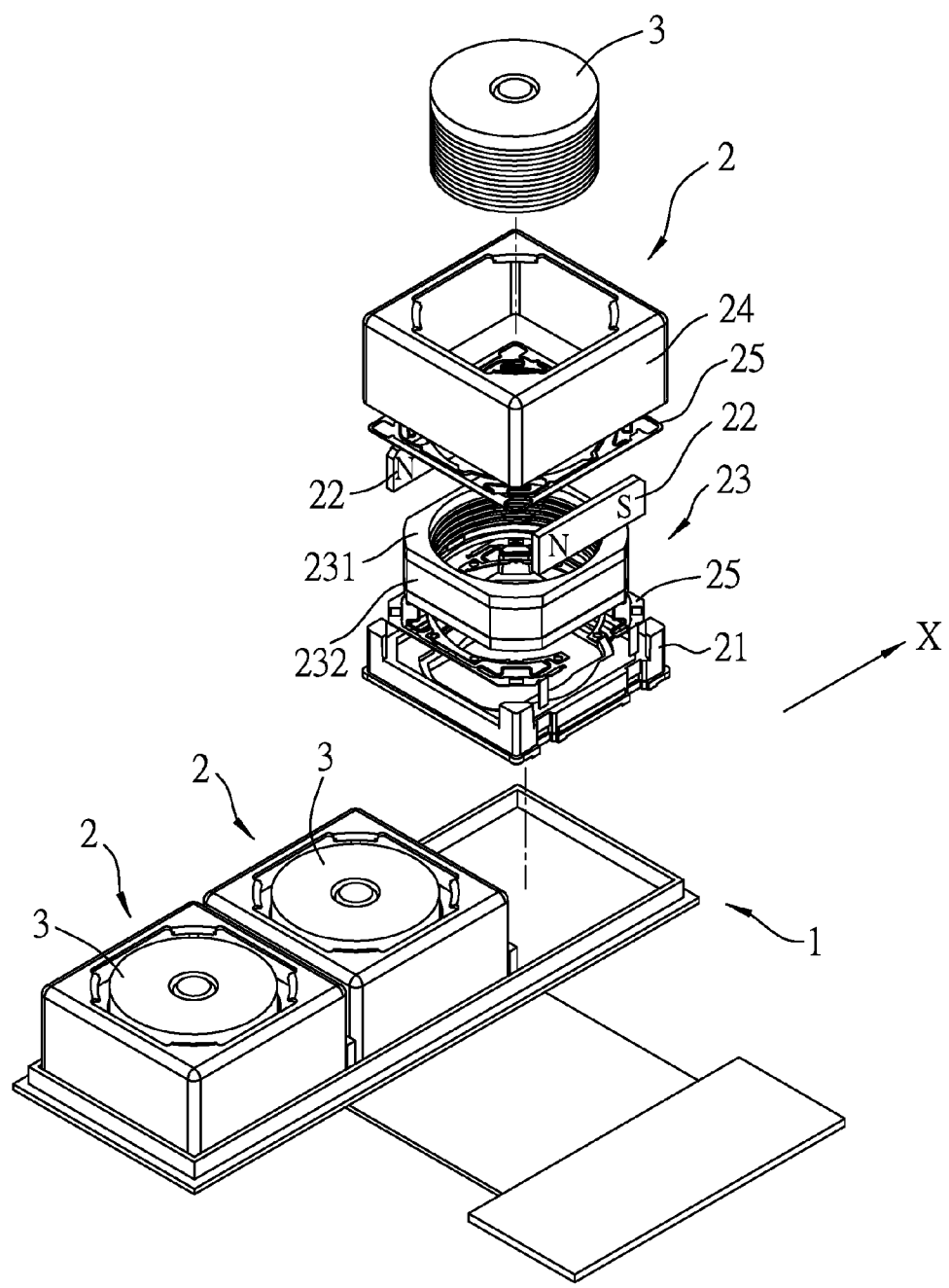
FIG. 1 is an exploded perspective view of the first embodiment of a voice coil motor array module according to the present invention.

Before the present invention is described in greater detail with reference to the accompanying embodiments, it should be noted herein that like elements are denoted by the same reference numerals throughout the disclosure.

Figure 2:
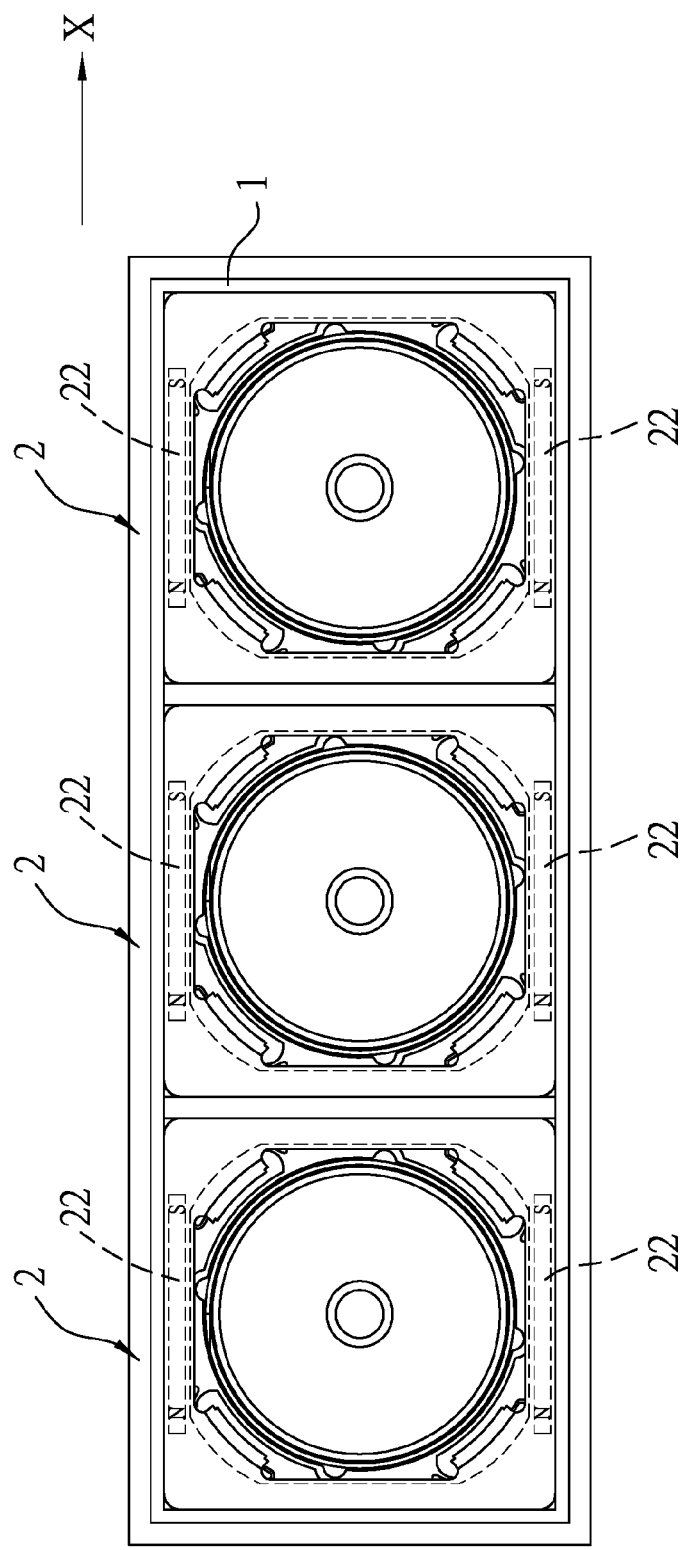
FIG. 2 is a schematic top view of the first embodiment, illustrating two magnetic components of each voice coil motor being opposite to each other along a line perpendicular to an arrangement direction of the voice coil motors.

Referring to FIGS. 1 and 2, the first embodiment of a voice coil motor array module according to the present invention is shown to comprise a carrier 1, and a plurality of voice coil motors 2 disposed on the carrier 1. Each of the voice coil motors 2 is used for carrying and driving a lens 3 to focus, so that a high resolution image can be captured. In this embodiment, three voice coil motors 2 are exemplified herein.

The carrier 1 is used for supporting the voice coil motors 2. In this embodiment, the carrier 1 is a circuit board coupled electrically to the voice coil motors 2.

The voice coil motors 2 are arranged side by side in a single row on the carrier 1 along an arrangement direction (X). Each voice coil motor 2 includes a base frame 21, two magnetic components 22, a lens holder 23, a cover frame 24 and two elastic components 25. The base frame 21 is disposed on the carrier 1. The magnetic components 22 are respectively disposed on two opposite sides of the base frame 21, and have the same magnetic poles facing each other. In this embodiment, the magnetic components 22 are permanent magnets, and have the north poles facing each other.

The lens holder 23 is disposed on the base frame 21, and has a holder body 231 for holding the lens 3, and a coil 232 wound around the holder body 231. The elastic components 25 are respectively disposed on top and bottom sides of the lens holder 23. The cover frame 24 covers the base frame 21, the magnetic components 22, the lens holder 23 and the elastic components 25.

When the coil 232 is energized, the coil 232 interacts with the two magnetic components 22 to drive displacement of the holder body 231 along a direction parallel to a normal direction of a plane of the arrangement direction (X), thereby moving the lens 3 along the normal direction of the plane for subsequent focusing and shooting operations.

Figure 3:
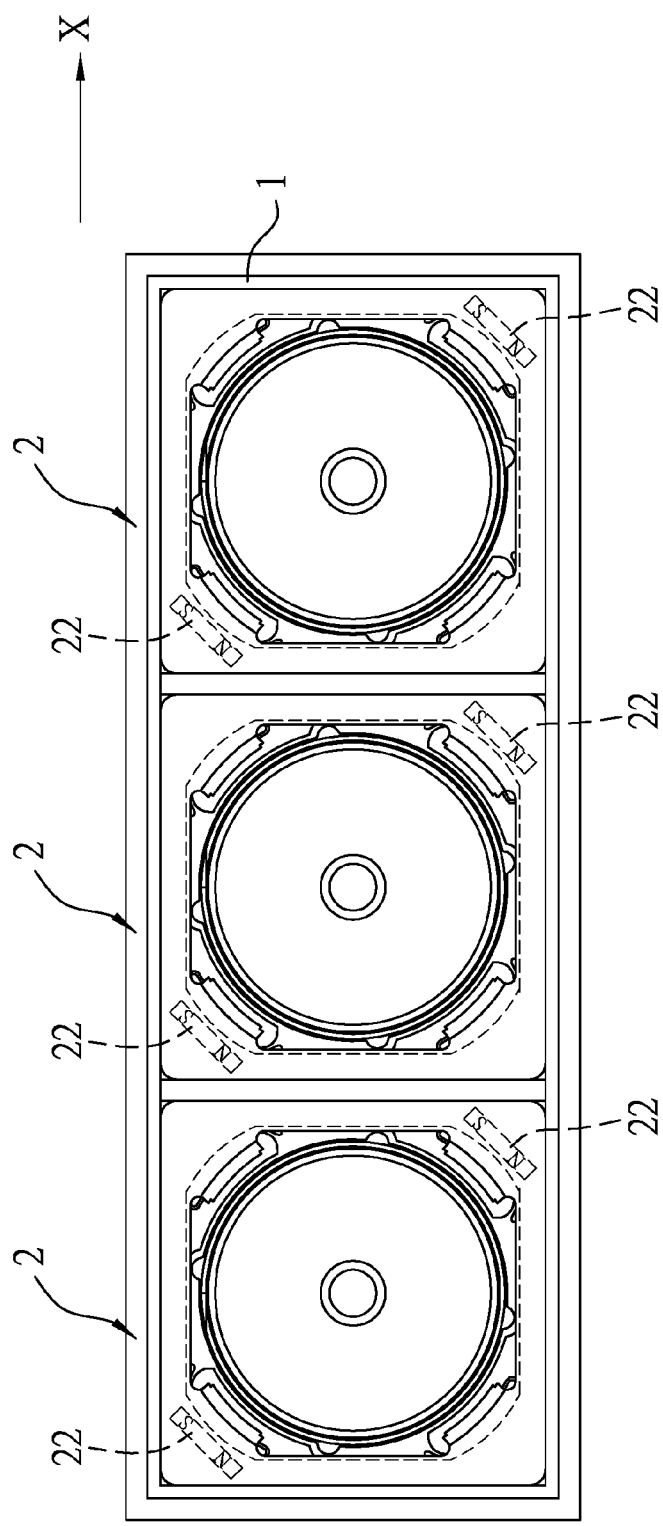
FIG. 3 is a view similar to FIG. 2, but illustrating the magnetic components of each voice coil motor opposite to each other along a line inclined with respect to the arrangement direction.
Figure 4:
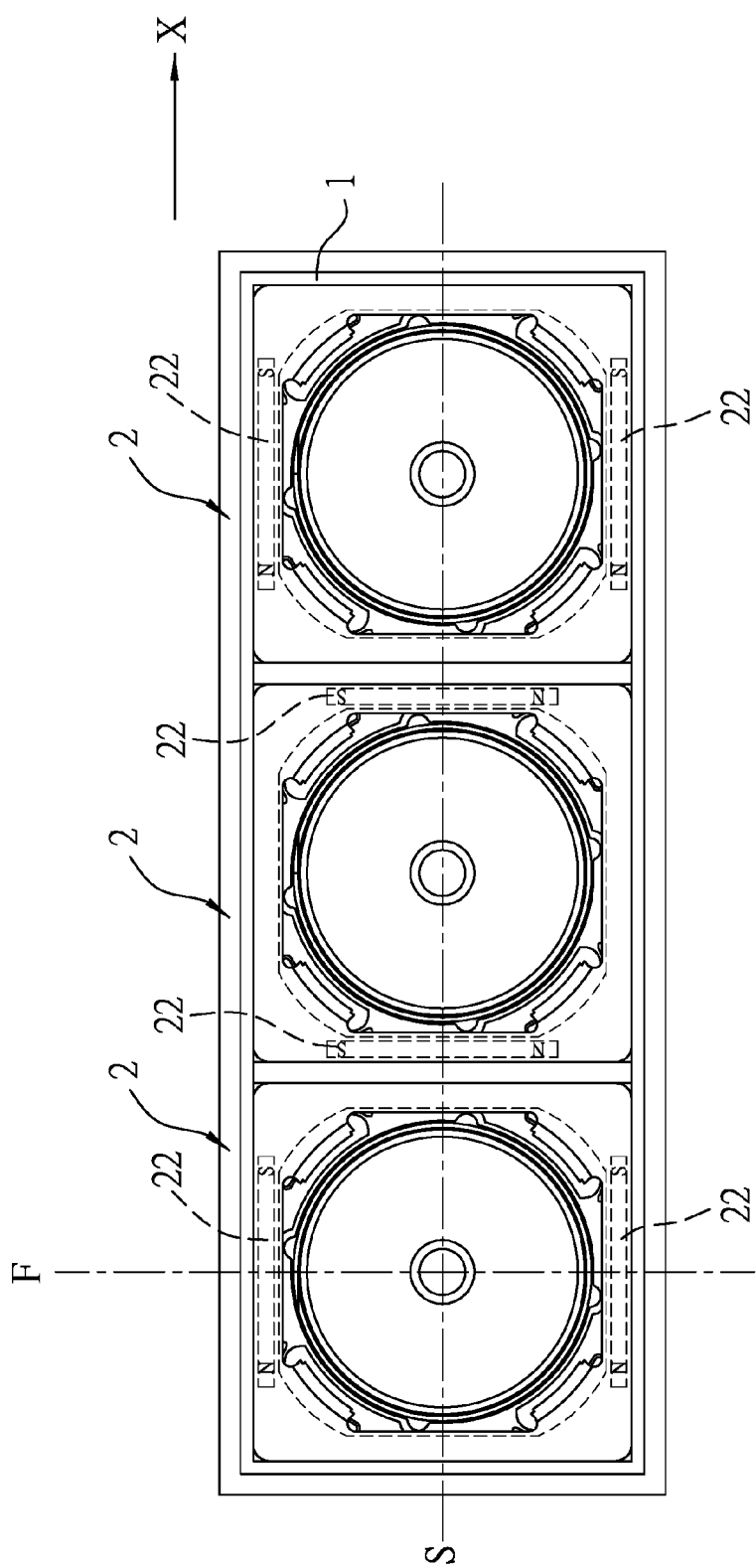
FIG. 4 is a view similar to FIG. 2, but illustrating the magnetic components of one of the voice coil motors opposite to each other along a first line perpendicular to the arrangement direction, and the magnetic components of an adjacent voice coil motor opposite to each other along a second line parallel to the arrangement direction.

In this embodiment, the voice coil motors 2 are arranged in a one-dimensional array. The magnetic components 22 of each voice coil motor 2 are opposite to each other along a line perpendicular to the arrangement direction (X). In an alternative embodiment, the magnetic components 22 of each voice coil motor 2 may be opposite to each other along a line that is inclined with respect to the arrangement direction (X) at an angle of 45 degrees, as shown in FIG. 3, or along a line that is inclined with respect to the arrangement direction (X) at an angle ranging from 45 degrees to 90 degrees. In another alternative embodiment, as shown in FIG. 4, the magnetic components 22 of one of the voice coil motors 2 are opposite to each other along a first line (F) perpendicular to the arrangement direction (X), while the magnetic components 22 of an adjacent voice coil motor 2 are opposite to each other along a second line (S) parallel to the arrangement direction (X). The first and second lines (F, S) are perpendicular to each other. Through this special arrangement, interference of magnetic forces between the magnetic components 22 of two adjacent voice coil motors 2 may be avoided, and inconvenience caused by magnetic attraction and repulsion between the magnetic components 22 during an assembly process may be resolved. With the voice coil motors 2 being kept at suitable distances and in an adjacent arrangement with respect to one another, the voice coil motors 2 can precisely and independently drive displacement of the lenses 3 for focusing and capturing a plurality of images with high resolution and small parallax.

Figure 5:
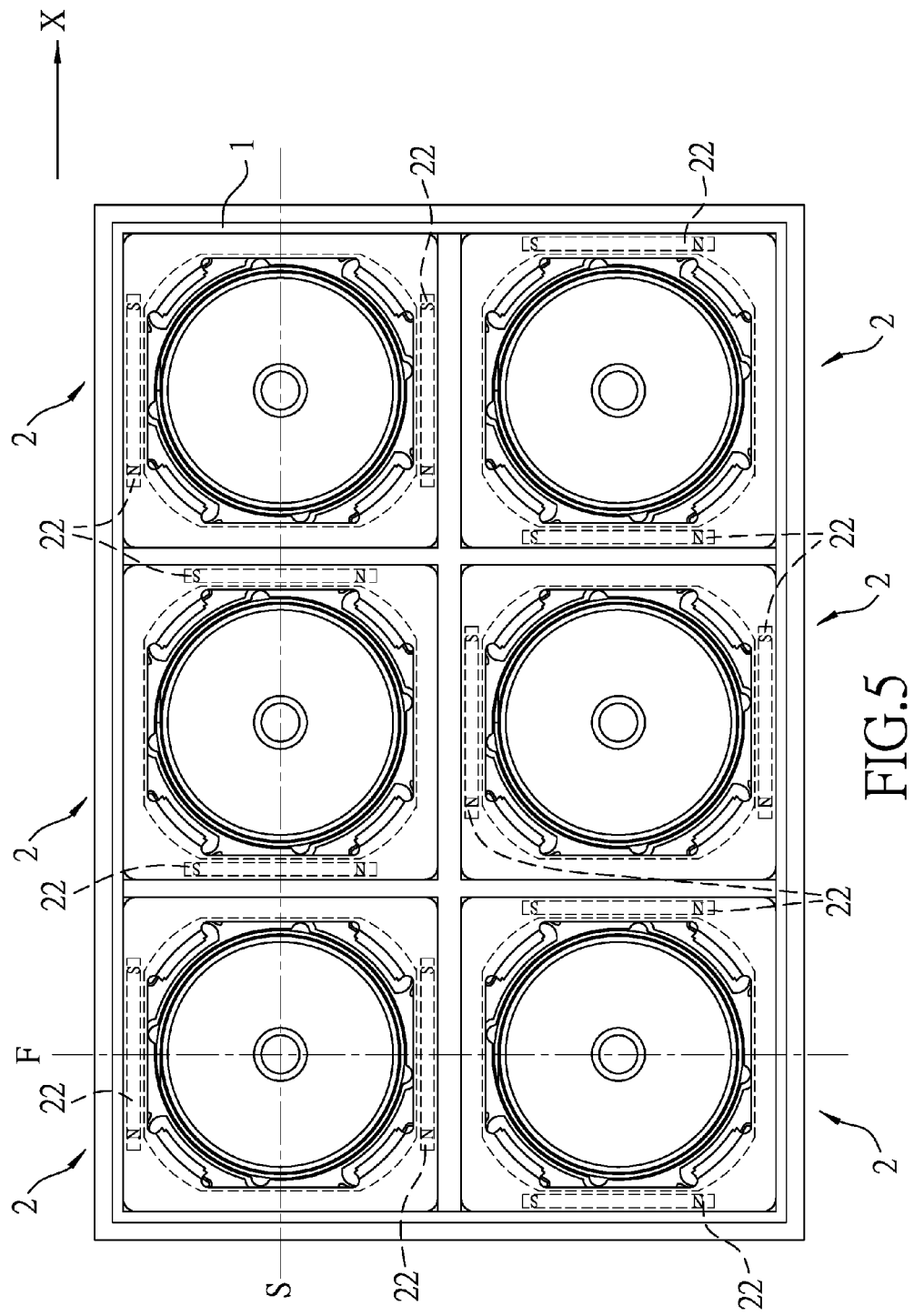
FIG. 5 is a schematic top view of the second embodiment of a voice coil motor array module according to the present invention.

Referring to FIG. 5, the second embodiment of the voice coil motor array module according to the present invention is shown to be substantially identical to the first embodiment. However, in this embodiment, the voice coil motors 2 are arranged in two rows along the arrangement direction (X). That is, the voice coil motors 2 extend along the arrangement direction (X) and a direction perpendicular to the arrangement direction (X) to form a two-dimensional matrix, so that a plurality of the lenses 3 (see FIG. 1) may be driven independently. Moreover, the magnetic components 22 of one of the voice coil motors 2 are opposite to each other along a first line (F) perpendicular to the arrangement direction (X), while the magnetic components 22 of the voice coil motor 2 that is adjacent to the one of the voice coil motors 2 either along the arrangement direction (X) or the direction perpendicular to the arrangement direction (X) are opposite to each other along a second line (S) parallel to the arrangement direction (X). The first and second lines (F, S) are perpendicular to each other. Through this arrangement, magnetic attraction and repulsion between the magnetic components 22 of two adjacent voice coil motors 2 may also be avoided.

In sum, the voice coil motor array module of this invention can effectively avoid interference caused by magnetic attraction and repulsion between two adjacent voice coil motors 2 by appropriately controlling the arrangement of the magnetic components 22 of the voice coil motors 2. As such, inconvenience during the assembly process can be minimized, and the voice coil motors 2 can be disposed close to each other for driving the multiple lenses 3 to focus and capture images with small parallax. The quality of the captured images can thus be enhanced. Therefore, the object of this invention is achieved.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A voice coil motor array module comprising:
    a carrier; and
    a plurality of voice coil motors disposed on said carrier and arranged side by side in at least one row along an arrangement direction, each of said voice coil motors including:
        a lens holder having a holder body and a coil wound around said holder body, and
        two magnetic components respectively disposed on two opposite sides of said holder body and having the same magnetic poles facing each other, wherein, when said coil is energized, said coil interacts with said magnetic components to drive displacement of said holder body along a direction parallel to a normal direction of a plane of the arrangement direction.

2. The voice coil motor array module as claimed in claim 1, wherein said magnetic components are opposite to each other along a line that is inclined with respect to the arrangement direction at an angle ranging from 45 degrees to 90 degrees.

3. The voice coil motor array module as claimed in claim 1, wherein said magnetic components are opposite to each other along a line that is perpendicular to the arrangement direction.

4. The voice coil motor array module as claimed in claim 1, wherein: said magnetic components of one of said voice coil motors are opposite to each other along a first line perpendicular to the arrangement direction, and said magnetic components of an adjacent one of said voice coil motors are opposite to each other along a second line parallel to the arrangement direction, said first and second lines being perpendicular to each other.

5. The voice coil motor array module as claimed in claim 1, wherein said voice coil motors are arranged in multiple rows along the arrangement direction.

6. The voice coil motor array module as claimed in claim 5, wherein: said magnetic components of one of said voice coil motors are opposite to each other along a first line perpendicular to the arrangement direction, and said magnetic components of an adjacent one of said voice coil motors are opposite to each other along a second line parallel to the arrangement direction, said first and second lines being perpendicular to each other.

7. The voice coil motor array module as claimed in claim 1, wherein said magnetic components of each of said voice coil motors are parallel to each other.

8. The voice coil motor array module as claimed in claim 1, wherein said carrier is a circuit board coupled electrically to said voice coil motors.

\* \* \* \* \*